Feb. 22, 1944.　　　H. M. STUELAND　　　2,342,308
HOIST CONTROL MECHANISM
Filed July 30, 1942　　　2 Sheets-Sheet 1
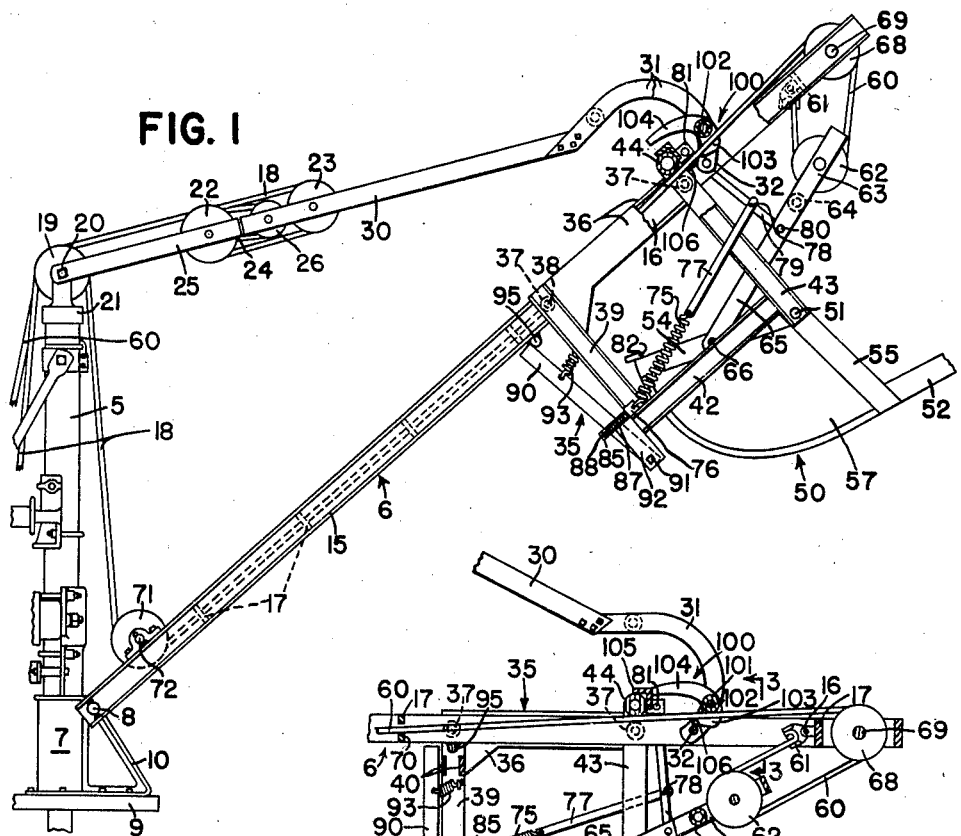
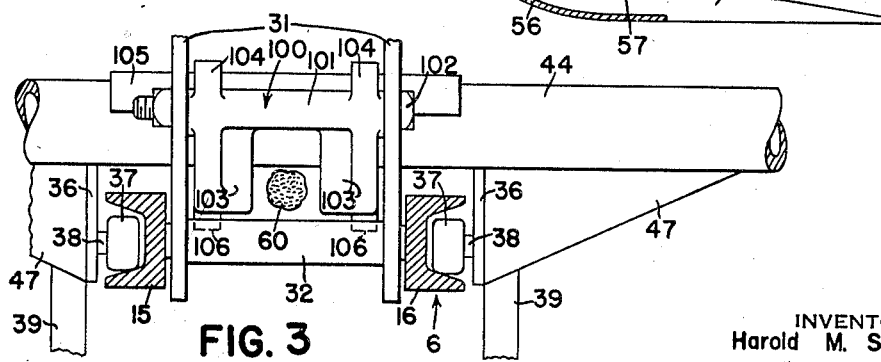
INVENTOR
Harold M. Stueland

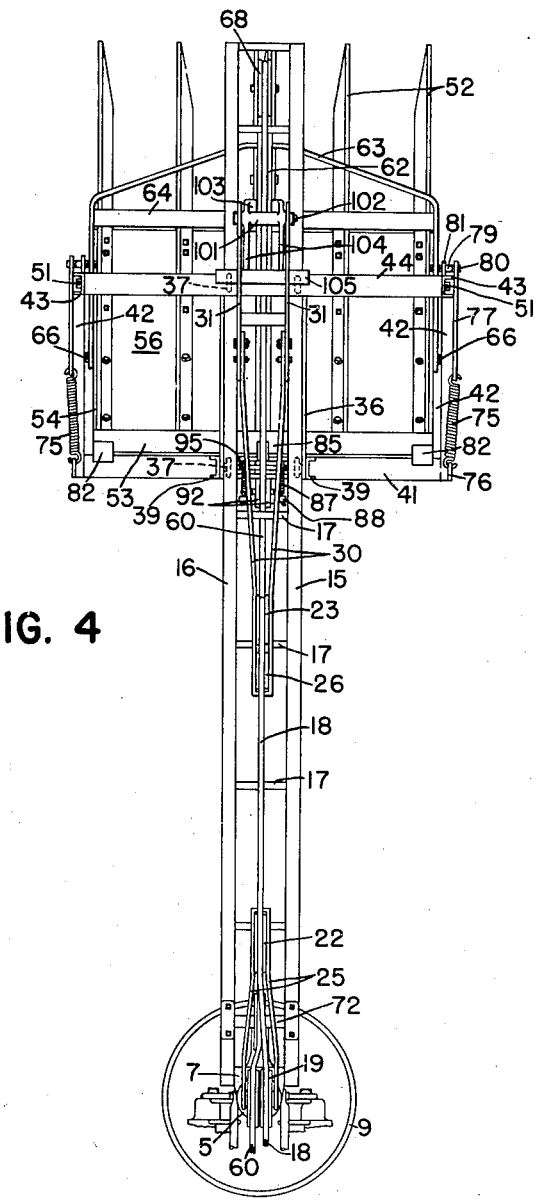

Patented Feb. 22, 1944

2,342,308

UNITED STATES PATENT OFFICE 2,342,308

HOIST CONTROL MECHANISM

Harold M. Stueland, East Moline, Ill., assignor to Deere & Company, East Moline, Ill., a corporation of Illinois Application July 30, 1942, Serial No. 452,973

14 Claims. (Cl. 214—103)

The present invention relates generally to hoists and more particularly to those hoists of the type having a bucket carrying carriage which travels along a vertically swingable boom, such as the hoist shown and described in a co-pending application, Serial No. 356,410, filed September 12, 1940, by Frank T. Court and myself and issued October 6, 1942, as Patent No. 2,298,199. The present invention is in the nature of an improvement over the hoist shown and described in said co-pending application. In that device, the bucket carriage is drawn outwardly along the boom by means of a cable which is connected to the bucket in such a way that the pull on the cable tends to rotate the bucket in its trunnion supports on the carriage into dumping position, but the bucket is normally restrained from dumping by means of a latch mechanism. Near the outer end of the boom is provided a stop which engages the latch mechanism when the carriage reaches a certain position, releasing the latch and allowing the cable to rotate the bucket into dumping position. Heretofore, however, it has been necessary for the operator to use care to avoid running the carriage too far outwardly along the boom, when scraping material from the ground to load the bucket, in order to avoid releasing the bucket latch.

It is the principal object of the present invention, therefore, to provide a simple but effective automatic control device, which will prevent the bucket from becoming unlatched when the shovel is being scraped along the ground during loading operation, but which will permit the latch to release and dump the bucket, when the boom is raised to the desired position above a truck or wagon.

In the preferred embodiment of my invention, this object is accomplished simply by providing a movable detent actuated by a pendulum, which will stop the travel of the bucket before the latch is released by the stop means on the boom, when the latter is in a lowered position substantially parallel with the ground, but when the boom is raised the pendulum swings the detent out of engagement with the carriage, thereby permitting the latter to travel another few inches outwardly along the boom to the point at which the latch disengages.

Other objects and advantages of my invention will be apparent to those skilled in the art after a consideration of the following description, in which reference is had to the drawings appended hereto, in which Figure 1 is a side elevational view of a hoist embodying the principles of my invention, showing the boom in raised position, with the latch disengaged and the bucket starting on its dumping movement, a portion of the boom and carriage being broken away to more clearly show the details of the mechanism;

Figure 2 is a sectional elevation of the outer end of the boom and carriage, showing the boom in a substantially horizontal position, with the pendulum detent being disposed in engagement with the carriage to prevent further outward movement of the latter;

Figure 3 is a sectional view taken along a line 3—3 in Figure 2 and drawn to an enlarged scale; and Figure 4 is a plan view of the hoist with the boom in horizontal position.

Referring now to the drawings, the hoist comprises a relatively stationary mast 5, and a relatively shiftable track member in the form of a boom 6 pivotally mounted on a sleeve casting 7 by means of a generally horizontal pin 8. The sleeve casting 7 is journaled on the mast 5 for rotary movement about the vertical axis of the latter to swing the boom 6 laterally. The sleeve 7 is moved by suitable mechanism (not shown) connected with a drive wheel 9 fixed to the lower end of the sleeve 7 by a brace 10. Reference may be had to my co-pending application for a detailed description of the drive mechanism.

The boom 6 comprises a pair of parallel channel members 15, 16 connected rigidly together by transverse struts 17. The boom 6 is raised and lowered about the axis of the pivot pin 8 by means of a cable 18, which passes upwardly over a sheave 19 journaled on a shaft 20 carried on a swivel cap 21, the latter being mounted on top of the stationary mast 5 and rotatable relative thereto about the vertical axis of the mast. From the sheave 19 the cable 18 passes around a sheave 23, back over a second sheave 24, over a third sheave 26, and is anchored at 24 on a supporting strut 25, at the end of which the sheave 22 is journaled. The strut 25 is secured at its opposite end to the shaft 20 mounted on the swivel cap 21, by means providing for vertical swinging movement of the strut 25 about the axis of the shaft 20. The sheaves 23 and 26 are journaled for rotation on the inner end of a pair of laterally spaced strap members 30, which diverge outwardly and are provided at their outer ends with arcuate portions 31, which are swingably connected to the boom 6, by means of a transverse bar 32, which extends between the two channel members 15, 16 of the boom and is rigidly connected thereto. Since the curved portions 31 are rigid with respect to the strap members 30, the pull of the cable 18 upon the sheaves 23 and 26 is transmitted through the bar 32 to raise the boom vertically about the axis of the pivot pin 8.

A bucket carriage 35 is adapted to travel along the boom 6, and comprises a pair of parallel side plates 36 disposed on opposite sides of the boom members 15, 16 and closely adjacent thereto. Each of the side plates 36 is supported on a pair of longitudinally spaced wheels or rollers 37, journaled on trunnions 38 which are fixed to the inner sides of the plates 36 adjacent the ends thereof, as best shown in Figure 3. The wheels 37 travel within the flanges of the channel members 15, 16, and thus hold the carriage against tilting movement relative to the boom 6.

The rear ends of the side plates 36 are connected to a pair of downwardly extending legs 39, respectively, which are interconnected beneath the boom by a pair of transverse braces 40. The lower ends of the legs 39 are rigidly fixed to a transverse channel member 41, the latter being connected at opposite ends, respectively, to a pair of forwardly extending supporting frame members 42 to form a U-shaped bucket supporting frame. The forward ends of the side members 42 are rigidly attached to a pair of vertical frame members 43, the upper ends of the latter being rigidly interconnected by a tubular member 44 extending transversely above the boom 6. The tubular member 44 is also fixed, as by welding, to the upper edge of each of the side plates 36 at the forward ends thereof, and braced to the latter by vertical gussets 47.

A bucket 50 is swingably supported on a pair of trunnions 51 at the lower ends of the forward vertical frame members 43. The bucket comprises a plurality of longitudinally extending digging teeth 52, the rear ends of which are curved upwardly and are interconnected at their rear ends by a transverse angle member 53. A pair of supporting side members 54 extend forwardly from opposite ends of the angle member 53 and the forward ends of the side members 54 are supported on the trunnions 51. The forward ends of the members 54 are connected to the intermediate portion of the two outer teeth 52 by means of generally vertical frame members 55. A bottom sheet 56 extends around the lower sides of the teeth 52 from the lower ends of the vertical members 55 and is curved upwardly and rearwardly to the transverse angle member 53. A pair of side walls 57 enclose the two sides of the bucket and are supported on the two outer teeth 52 and on the frame members 54, 55.

The carriage 35 is pulled outwardly along the track member or boom 6, by means of a cable 60, the end of which is anchored by means of a suitable bolt 61 or the like to the boom 6 adjacent the outer end thereof. The cable is trained around a sheave 62, which is journaled on an arm 63, which is rigidly fixed to a transverse pipe member 64, that forms a part of a bail having a pair of laterally spaced arms 65. Each of the arms 65 is pivotally connected by means of a bolt 66 at its rear end, to one of the upper frame members 54 of the bucket 50, respectively. The cable 60 passes around the sheave 62 and forwardly over a second sheave 68, journaled on a shaft 69 at the outer end of the boom 6. The cable 60 then passes rearwardly along the boom between the two channel members 15, 16, and through apertures 70 in the transverse bracing members 17. At the inner end of the boom the cable 60 passes under a sheave 71, which is journaled on a shaft 72 and extends upwardly in front of the mast 5 to a sheave 73 journaled on the supporting axle 20 on the swivel cap 21. This sheave is independent of the boom raising sheave 19 and rotates independently thereof. The cable 60 then passes downwardly on the opposite side of the mast 5 to a suitable power actuated drum, the details of which are shown in the above-mentioned co-pending application, although any suitable power or hand operated winding drum will suffice for this purpose.

It will be noted that inasmuch as the bail arms 65 are pivoted at 66 to the bucket and extend past the bucket trunnions 51 in offset relation above the latter, a pull on the cable 60 will have a tendency to rotate the bucket 50 in a clockwise direction as viewed in Figures 1 and 2, about the common axis of the trunnion pivots 51. The bucket is biased toward carrying position by means of a pair of tension springs 75, one on each side of the bucket, the rear ends of which are anchored to lugs 76 at opposite ends of the transverse channel members 41, respectively, the forward ends of the springs 75 being connected to straps 77, the opposite ends of the straps 77 being pivotally connected at 78 to a pair of arms 79, respectively, intermediate the ends of the latter. Each of the arms 79 is disposed substantially vertically, having their lower ends pivotally connected at 80 to the arms 65, respectively, and their upper ends pivotally connected to suitable lugs 81 fixed to the forward ends of the carriage side plates 36. Thus, the tension of the spring 75 pulls rearwardly through the strap 77 against the arm 79, the latter acting to force the arms 65 rearwardly and move the bucket in a counterclockwise direction about the axis of the trunnions 51. A pair of stop members 82 are attached to the upper transverse frame member 53 of the bucket 50, and overhang the latter in a rearward direction in order to engage the top of the transverse channel member 41 to stop the rotation of the bucket in its carrying position.

Normally, the bucket is locked in this position by means of a latch member 85, which extends through a latch casing 86, supported on the top of the carriage channel member 41. The latch 85 is urged in a locking position overlapping the transverse angle member 53 of the bucket, by means of a coil spring 87, which acts against a bolt 88 in the rear end of the latch member 85, and is suitably connected to the carriage frame member 41. The latch 85 can be withdrawn rearwardly by means of a lever 90, which is pivotally connected by a bolt 91 to the lower end of a bracket 92, which is welded to the carriage frame member 41 and extends downwardly therefrom. The lever 90 bears against the bolt 88, and therefore by swinging the lever 90 to the left as viewed in Figures 1 and 2, the latch 85 can be withdrawn from in register with the angle member 53, allowing the bucket 50 to be rotated in a clockwise direction to dumping position by a further pull on the cable 60.

Normally, the latch 85 holds the bucket in carrying position, and the lever 90 is biased by a spring 93 against the transverse carriage frame member 40. The upper end of the lever 90, however, is disposed in register with a transverse bar 95, fixed to the lower side of the boom members 15, 16 near the outer end thereof. Thus, as the carriage and bucket are drawn outwardly along the boom by the cable 60, the upper end of the lever 90 engages the bar 95, which serves as a stop, where upon further outward movement of the carriage, the lever 90 withdraws the latch 85 from engagement with the bucket frame member 53. A further pull on the cable 60 rotates the bucket into dumping position.

As previously explained, it is not desirable to release the bucket latch when the bucket is being scraped along the ground during the filling operation, and therefore it has heretofore been necessary for the operator to exercise care to prevent the carriage from traveling far enough along the beam to engage the lever and stop. I have avoided this difficulty, according to the present invention, by providing a pendulum stop member, indicated in its entirety by reference numeral 100, comprising a transverse sleeve portion 101 disposed transversely between the arcuate stop members 31 and secured thereto by means of a through bolt 102, in such a manner that the pendulum member 100 is freely rotatable on the bolt 102. A pair of pendulum weights 103 are secured to the sleeve 101 and are spaced apart to allow the cable 60 to pass therebetween. A pair of arms 104 extend rearwardly from the sleeve portion 101, the arms 104, the weights 103, and the sleeve 101 being formed preferably as an integral casting. The weight of the pendulum weights 103 is sufficient to cause the pendulum casting member 100 to rotate on the bolt 102 and assume a predetermined position with the weights hanging downwardly, and to maintain this position regardless of the vertical swinging movement of the boom. Thus, as shown in Figure 2, when the boom 6 is lowered to a substantially horizontal position to permit the bucket 50 to be scraped along the ground when loading the same, the pendulum casting member 100 is disposed in such a position that the arms 104 are disposed in register with the upper transverse tubular frame member 44 of the carriage, so that as the carriage approaches the outer end of the boom, the arms 104 will engage an angular bumper 105, which is rigidly welded to the tubular member 44. Relative locations of the arms 104 and stop member 95 are such that the arms 104 engage the bumper 105 before the lever 90 engages the stop 95, and therefore the carriage is prevented from traveling outwardly to the point at which the bucket is unlatched and dumped.

The pendulum member 100 is so balanced that it is in position to engage the bumper 105 when the boom is lowered to an angle of approximately twenty degrees above the horizontal. At this point, a pair of lugs 106, formed integral with the pendulum weights 103, engage the transverse frame bar 32 and prevent any further angular movement of the member 100 as the boom is lowered to or below a horizontal position, thus maintaining the pendulum in stopping position over a reasonable range of movement of the boom near the horizontal position.

With the boom in raised position as indicated in Figure 1, which is the position in which the bucket is held over a truck or wagon to dump the contents of the bucket into the latter, the pendulum stop member 100 has been rotated by the force of gravity, as the boom swings upwardly, to a position in which the arms 104 are above the transverse pipe member 44 and therefore do not engage the bumper 105 as the carriage moves upwardly and outwardly along the boom. Thus, when the boom is in raised position, the carriage is not stopped until after the lever 90 has engaged the stop 95 and tripped the latch 85, after which the pull on the cable can tilt the bucket into dumping position. Thus it is evident that it is the angular position of the boom with respect to the direction of gravitational force, which determines whether or not the carriage can be drawn sufficiently far to disengage the latch.

I claim:

1. In a material handling device, a shiftable track member, a carriage movable along the latter, a bucket supported on said carriage and movable relative thereto between dumping and carrying positions, means responsive to movement of said carriage into a certain position on said track member for controlling the dumping of said bucket, and means responsive to the position of said shiftable track member for preventing said carriage from moving into said certain position.

2. In a material handling device, a shiftable track member, a carriage movable along the latter, a bucket supported on said carriage and movable relative thereto between dumping and carrying position, latch means for retaining said bucket in carrying position, stop means on said track member for disabling said latch means, and means responsive to the position of said shiftable track member for blocking the carriage in its movement along said track to prevent the carriage from reaching a position in which said latch means engages said stop means.

3. In a material handling device having a vertically swingable boom, a carriage movable along the latter, a bucket supported on said carriage by means providing for movement relative thereto between carrying and dumping positions, means responsive to the position of said carriage on said boom for controlling the dumping of said bucket, and means responsive to the angular position of said boom for effecting the movement of said carriage along the boom.

4. In a material handling device having a vertically swingable boom, a carriage movable along the latter, a bucket supported on said carriage by means providing for movement relative thereto between carrying and dumping positions, means responsive to the position of said carriage on said boom for controlling the dumping of said bucket, and gravity actuated means responsive to the angular position of said boom for controlling the movement of said carriage into a position effecting dumping of said bucket.

5. In a material handling device having a vertically swingable boom, a carriage movable along the latter, a bucket supported on said carriage by means providing for movement relative thereto between carrying and dumping positions, means responsive to movement of said carriage into a certain position on said boom for controlling the dumping of said bucket, and gravity actuated detent means, responsive to the angular position of said boom, for preventing said carriage from moving into said certain position.

6. In a material handling device having a vertically swingable boom, a carriage movable along the latter, a bucket supported on said carriage by means providing for movement relative thereto between carrying and dumping positions, latch means for retaining said bucket in carrying position, stop means on said boom engageable with said latch means when said carriage moves into a certain position on said boom for releasing said latch and permitting said bucket to move into dumping position, and gravity actuated detent means, responsive to the angular position of said boom, for preventing said carriage from moving into said certain position when said boom is disposed within a predetermined angular position.

7. In a material handling device having a vertically swingable boom, a carriage movable along the latter, a bucket supported on said carriage by means providing for movement relative thereto between carrying and dumping positions, means responsive to movement of said carriage into a certain position on said boom for controlling the dumping of said bucket, a detent mounted on said boom by means providing for movement thereof into and out of engagement with said carriage for preventing the latter from moving into said certain position, and pendulum means for moving said detent into engagement with said carriage when said boom is swung beyond a predetermined angular position.

8. In a material handling device having a vertically swingable boom, a carriage movable along the latter, a bucket supported on said carriage by means providing for movement relative thereto between carrying and dumping positions, latch means for retaining said bucket in carrying position, stop means on said boom engageable with said latch means when said carriage moves into a certain position on said boom, for releasing said latch and permitting said bucket to move to dumping position, a detent mounted on said boom by means providing for movement thereof into and out of engagement with said carriage to prevent the latter from moving into said certain position, and pendulum means for moving said detent into engagement with said carriage when said boom is lowered beyond a predetermined angular position.

9. In a material handling device having a vertically swingable boom, a carriage movable along the latter, a bucket supported on said carriage by means providing for movement relative thereto between carrying and dumping positions, means responsive to movement of said carriage into a certain position on said boom for controlling the dumping of said bucket, a detent mounted on said boom by means providing for movement thereof into and out of engagement with said carriage for preventing the latter from moving into said certain position, pendulum means for moving said detent into engagement with said carriage when said boom is swung beyond a predetermined angular position, and stop means for maintaining said detent means in engaging position as the boom is swung beyond said predetermined angular position.

10. In a material handling device having a vertically swingable boom, a carriage movable along the latter, a bucket supported on said carriage by means providing for movement relative thereto between carrying and dumping positions, latch means for retaining said bucket in carrying position, stop means on said boom engageable with said latch means when said carriage moves into a certain position on said boom, for releasing said latch and permitting said bucket to move to dumping position, a detent mounted on said boom by means providing for movement thereof into and out of engagement with said carriage to prevent the latter from moving into said certain position, pendulum means for moving said detent into engagement with said carriage when said boom is lowered beyond a predetermined angular position, and stop means on said pendulum engageable with said boom for preventing further movement of said detent when the boom is lowered beyond said predetermined angular position.

11. In a material handling device having a vertically swingable boom, a carriage movable along the latter, a bucket supported on said carriage by means providing for movement relative thereto between carrying and dumping positions, latch means for retaining said bucket in carrying position, detent means for arresting outward movement of said carriage before the latter reaches the end of said boom, said detent means being shiftable to disabled position, means on said boom engageable with said latch means to unlatch the latter when said carriage moves beyond the position in which it is arrested by said detent, and means for controlling the position of said shiftable detent means.

12. In a material handling device having a vertically swingable boom, a carriage movable along the latter, a bucket supported on said carriage by means providing for movement relative thereto between carrying and dumping positions, latch means for retaining said bucket in carrying position, shiftable detent means for arresting outward movement of said carriage short of the end of said boom when the latter is in a lowered position for loading the bucket, means for shifting said detent means to disabled position responsive to swinging of said boom upwardly to a bucket dumping position to permit said carriage to move beyond the arrested position, and means on said boom engageable with said latch means when said carriage is disposed outward on the boom beyond the detent arrested position, for unlatching said latch means to dump said bucket.

13. In a material handling device having a vertically swingable boom, a carriage movable along the latter, a bucket supported on said carriage by means providing for movement relative thereto between carrying and dumping positions, latch means for retaining said bucket in carrying position, detent means for arresting outward movement of said carriage before the latter reaches the end of said boom, said detent means being rotatable about a substantially horizontal axis to disabled position, means on said boom engageable with said latch means to unlatch the latter when said carriage moves beyond the position in which it is arrested by said detent, and means for controlling the position of said rotatable detent means, comprising a pendulum fixed to said detent means and actuated by gravity to rotate the latter when said boom is swung vertically.

14. The combination set forth in claim 12 including the further provision that said detent means is shiftable angularly about an axis substantially parallel to the axis of vertical swinging movement of said boom, and said detent shifting means includes a pendulum device attached to said detent means.

HAROLD M. STUELAND.